April 6, 1954          O. A. EGER          2,674,140
ADJUSTABLE THRUST BEARING FOR ACCURATELY POSITIONING
ONE OF TWO GROOVED MILL ROLLS
Filed Oct. 23, 1947          4 Sheets-Sheet 1

INVENTOR
OSCAR A. EGER
by his attorneys
Stebbins, Blenko & Webb

April 6, 1954
O. A. EGER
2,674,140
ADJUSTABLE THRUST BEARING FOR ACCURATELY POSITIONING
ONE OF TWO GROOVED MILL ROLLS
Filed Oct. 23, 1947
4 Sheets-Sheet 2
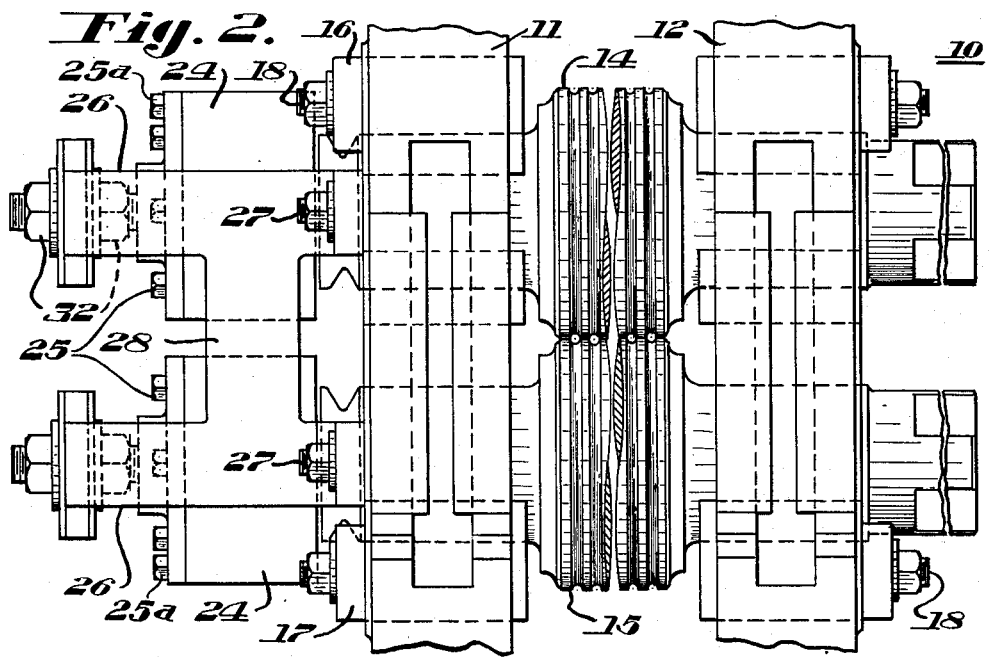
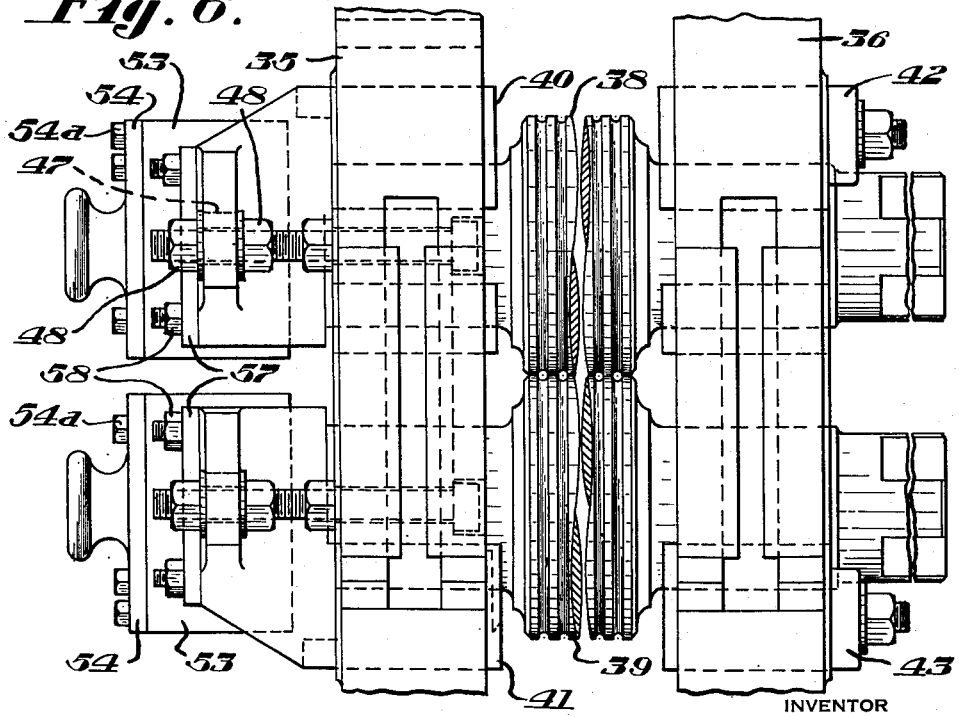
INVENTOR
OSCAR A. EGER
by his attorneys
Stebbins, Blenko & Webb April 6, 1954            O. A. EGER            2,674,140
ADJUSTABLE THRUST BEARING FOR ACCURATELY POSITIONING
ONE OF TWO GROOVED MILL ROLLS
Filed Oct. 23, 1947            4 Sheets-Sheet 3
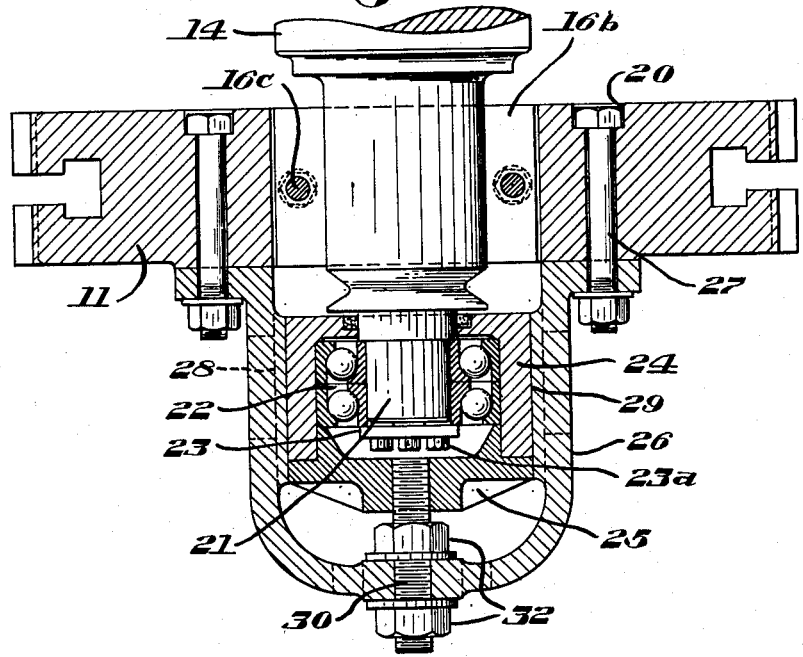
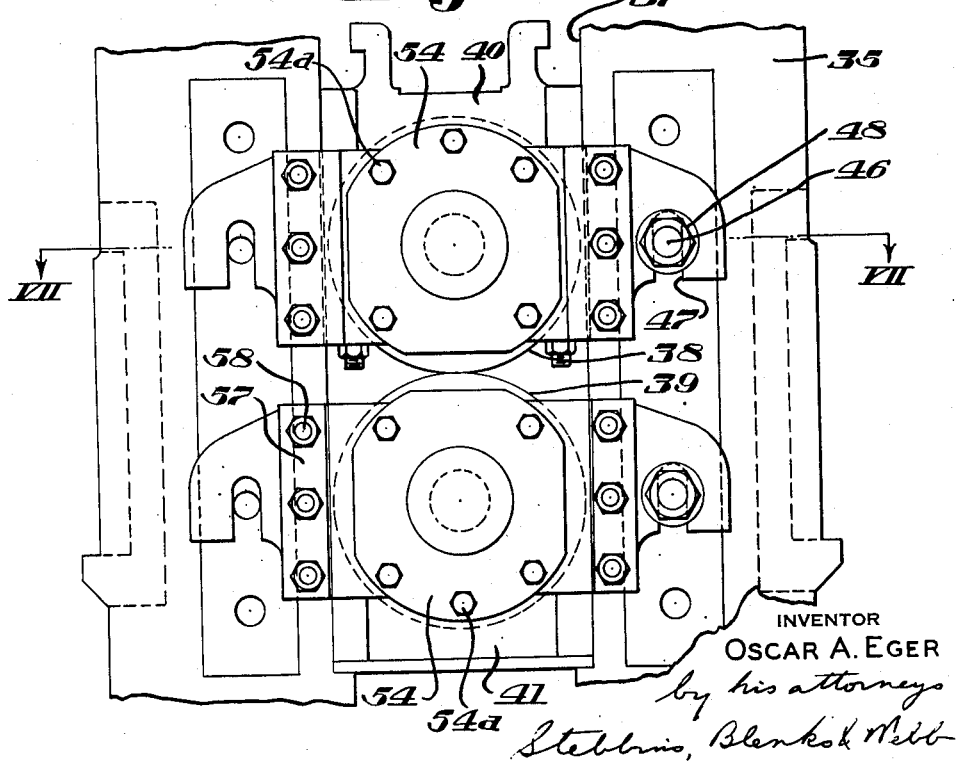
INVENTOR
OSCAR A. EGER April 6, 1954 O. A. EGER 2,674,140
ADJUSTABLE THRUST BEARING FOR ACCURATELY POSITIONING
ONE OF TWO GROOVED MILL ROLLS
Filed Oct. 23, 1947 4 Sheets-Sheet 4
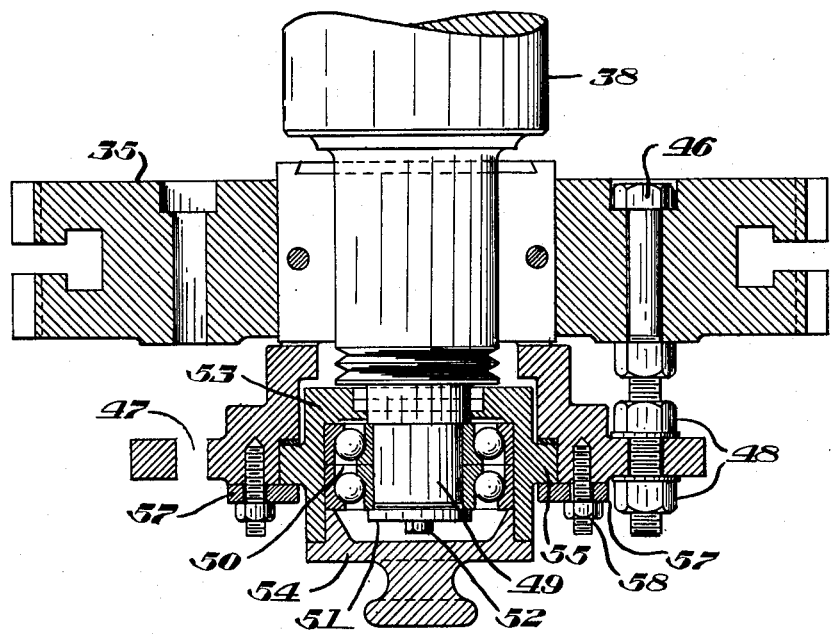
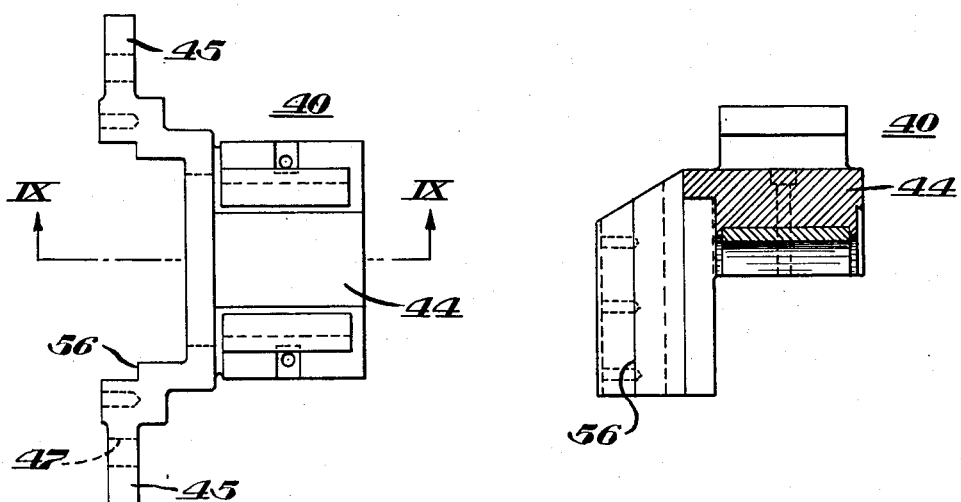
INVENTOR
OSCAR A. EGER
by his attorneys
Stebbins, Blenko & Webb

Patented Apr. 6, 1954

2,674,140

UNITED STATES PATENT OFFICE 2,674,140

ADJUSTABLE THRUST BEARING FOR ACCURATELY POSITIONING ONE OF TWO GROOVED MILL ROLLS

Oscar A. Eger, Shaler Township, Allegheny County, Pa., assignor, by mesne assignments, to Blaw-Knox Company, Pittsburgh, Pa., a corporation of Delaware Application October 23, 1947, Serial No. 781,636

2 Claims. (Cl. 80—56)

This invention relates to thrust bearings for the rolls of a mill for rolling bars and shapes and, in particular, to means for adjusting one or both of two cooperating rolls axially to bring the grooves in the bodies thereof into proper cooperative relation.

Mills for rolling bars and shapes are provided with rolls having mating grooves and it is essential that the grooves of the two rolls be maintained in the proper relative positions. Thrust bearings have been employed for holding the rolls against axial movement relative to the chocks or radial bearings in which the roll necks turn, and means have been proposed for adjusting such thrust bearings (and therefore the rolls themselves) in the axial direction. Some thrust-bearing adjusting means known previously depend on precisely symmetrical construction to obtain the exact equalization of forces necessary to effect the desired adjustment without introducing any bending stress. This is difficult to achieve in practice. Other adjusting means introduce substantial bending stress but rely on the stiffness of the roll to resist it. This involves some deflection, even though small, which is apt to cause binding in or injury to the bearings.

I have invented improved thrust-bearing adjusting means for mill rolls which overcomes the aforementioned objection and prevents the application of bending stress whether the adjusting force is applied axially or in asymmetric fashion. In a preferred embodiment, I provide means for guiding axial movement of the thrust bearing and confining it against movement in any direction other than axial. I also provide means independent of the guiding means for adjusting the thrust bearing axially. The guiding means is preferably a yoke secured to the mill housing and adapted slidably to receive the thrust-bearing. An adjusting screw cooperates with the thrust bearing and yoke. In a modified form, the thrust bearing is secured rigidly to a chock constituting the radial bearing for the roll neck, and a screw engages the chock for adjusting it and the thrust bearing axially in the housing.

A complete understanding of the invention may be obtained from the following detailed description and explanation which refer to the accompanying drawings illustrating a preferred embodiment and a modification. In the drawings, Figure 1 is a partial end elevation of a mill having the invention applied thereto;

Figure 2 is a side elevation corresponding to Figure 1;

Figure 3 is a partial section taken along the plane of line III—III of Figure 1;

Figure 5 is a partial end elevation showing a modified form of the invention;

Figure 6 is a partial side elevation thereof;

Figure 7 is a section taken along the plane of line VII—VII of Figure 5;

Figure 8 is a plan view of the bearing chock for the upper roll of the mill shown in Figures 5 and 6; and Figure 9 is a section taken along the plane of line IX—IX of Figure 8.

Figure 1:
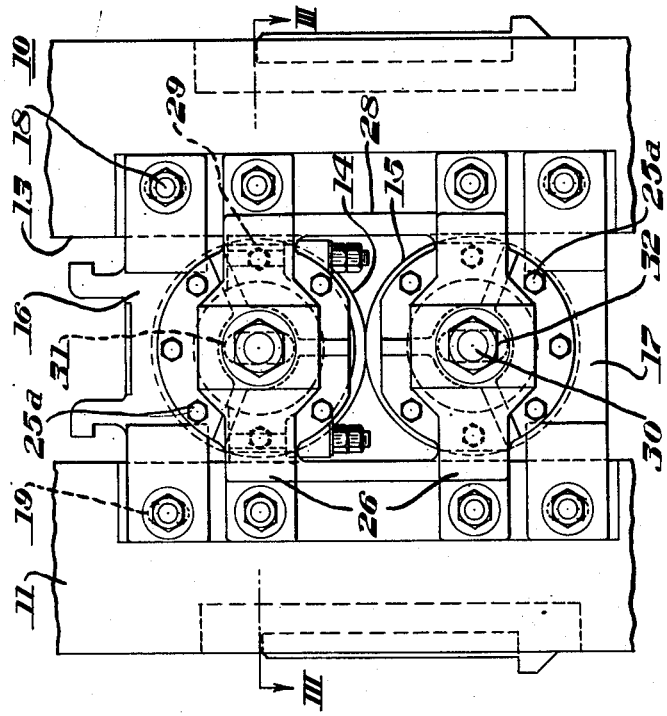
Figure 4:
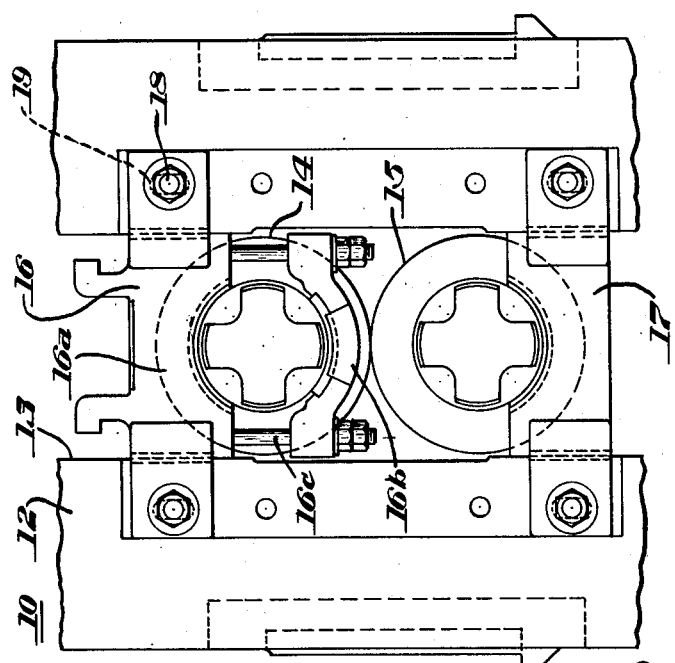
Figure 4 is a partial elevation of the end of the mill opposite that shown in Figure 1.

Referring in detail to the drawings and, for the present, to Figures 1 through 4, a rolling mill 10 includes a pair of spaced housings 11 and 12 having windows 13 therein. Rolls 14 and 15 have their necks journaled in chocks 16 and 17, respectively. The upper chocks 16 include a main upper portion 16a adapted to be engaged by the mill screws and a lower portion 16b suspended therefrom on hanger bolts 16c. The chocks are secured to the housings by bolts 18 fastened through slots 19 in the housings and have their heads seated in recesses 20 on the inner faces of the housings. The slots 19 permit vertical adjustment of the chocks.

One end of each of the rolls is reduced as at 21 and fitted with a thrust bearing 22. The thrust bearing is of the type having balls running in races and is secured to the end of the roll by a disc 23 held in place by screws 23a. The bearings 22 are enclosed in a box 24 having a cover 25 secured thereto by bolts 25a.

Yokes 26 are secured to the housing 11 by bolts 27. The yokes are connected by struts 28 on both sides thereof and are adapted slidably to receive the bearing boxes 24 of the two rolls, respectively. The yokes have finished surfaces 29 on which the sides of the bearing boxes slide. The yokes 26 confine the bearing boxes 24 against movement in a horizontal plane except in a direction axially of the rolls. Adjusting screws 30 extend through slots 31 in the yokes and are threaded into the covers 25 of the bearing boxes. Nuts 32 on the screw permit adjustment of the bearing boxes in the yokes, along the axes of the rolls. In other words, by backing off one nut and turning down the other, the bearing boxes may be shifted inwardly or outwardly, thus effecting the movement of one roll relative to the other as may be necessary to bring the grooves of the rolls into proper cooperative relation. Since the bearing boxes are confined against movement by the yokes except in an axial direction, and since the adjusting force is applied centrally of the bearing boxes, there is no possibility of bending stress or deflection resulting from unbalanced forces.

Figures 5 through 9 illustrate a modified form of adjusting means for the thrust bearing of a mill roll. In the modified construction the mill housings are shown at 35 and 36, the windows therein being designated 37. Rolls 38 and 39 have their necks at one end journaled in upper and lower chocks 40 and 41. The necks at the other end of the rolls are journaled in chocks 42 and 43 similar to the chocks 16 and 17. The chock 40 is shown in detail in Figures 8 and 9. The chock 41 is generally similar thereto except that it is adapted for the bottom roll. The chock 40 comprises a body portion 44 fitting in the housing window extending partly around the roll neck and adapted to be engaged by one of the mill screws. Laterally extending wings or ears 45 formed integral with the body portion are disposed outwardly of the housing when the body portion is in operative position in the window. The chock is secured to the housing by a bolt 46 extending through one of two holes in the latter on opposite sides of the window. The chock has slots 47 to accommodate the bolt and permit vertical adjustment of the chock. The chock is adjustable along the axis of the roll by means of nuts 48 on the end of the bolt 46 extending outwardly from the housing.

The rolls 38, 39 have reduced extensions 49 on the necks at one end fitted with thrust bearings 50 of the ball and race type. The bearings are secured to the rolls by a disc 51 and a screw 52 extending therethrough. The bearings are enclosed in boxes 53, each having a cover 54 secured thereto by bolts 54a and vertically disposed flanges 55 extending outwardly from the sides thereof. The ears 45 of the chock 44 are stepped as at 56 to accommodate the flanges 55 and the bearing boxes are secured thereto by keeper plates 57 and stud bolts 58 extending therethrough. The box containing the thrust bearing for each roll is thus firmly secured to the chock which affords the radial bearing for the adjacent roll neck. The chock is guided by the sides of the window on axial movement therein by adjustment of the nuts 48 on the bolt 46. The bearing boxes are thus confined against movement in any direction other than axially of the rolls. The adjustment of the chocks causes corresponding adjustment of the thrust bearing and also of the roll proper. In other words, the adjustment for the thrust bearing in the modified construction of Figures 5 through 9 is effected through the main bearing chock which moves axially with the roll and thrust bearing. Since axial movement of the chocks is guided by the sides of the housing window, no bending stress is applied to the thrust bearing and no deflection of the roll neck results even though the force for adjusting the thrust bearing is applied off center, i. e., along the axis of the bolt 46.

It will be apparent from the foregoing that the invention in either form disclosed herein is adapted to effect guided movement of the thrust bearing of a mill roll to permit axial adjustment thereof without setting up any bending stress or causing any deflection. I thus avoid the necessity for applying the adjusting force symmetrically even though this is actually the most convenient mode of application in the case of the preferred embodiment. The invention, furthermore, does not require the exact balancing of parallel adjusting forces. The adjusting means of my invention is therefore more sturdy and dependable and less likely to get out of order than adjusting means proposed heretofore for thrust bearings. In other words, the invention makes misalignment of the thrust bearings practically impossible. All that is required is that the necessary adjusting force be somehow applied to the bearing, either axially or eccentrically thereof.

Although I have illustrated and described but a preferred embodiment and a modification of the invention, it will be recognized that changes in the details of construction disclosed may be made without departing from the spirit of the invention or the scope of the appended claims.

I claim:

1. An axial alignment assembly for a rolling mill having conventional housings and rolls therein, said rolls having cylindrical necked and end portions, comprising in combination, radial bearing chocks connected to said housings to engage said necked portions and support said rolls, a hollow generally cylindrical anti-friction thrust bearing having an inner portion circumferentially fixed around said end portion of one of said rolls, a bearing box connected to the outer portion of said thrust bearing, said bearing box having generally opposite and symmetrically disposed vertical sliding surfaces thereon parallel to the axis of said one of said rolls, a yoke rigidly connected to the housing adjacent said end portion, said yoke extending around said bearing box outwardly of said end portion of said one of said rolls, said yoke further having surfaces engaging said first-named surfaces of said bearing box to provide relative vertical slidable adjustment engagement between said yoke and said bearing box, said surfaces further providing relative axial adjustment engagement movement without rotational movement between said bearing box and said yoke, an adjusting screw respectively engaging said bearing box and yoke to axially move said bearing box relative to said yoke.

2. An axial alignment assembly for a rolling mill having conventional housings and rolls therein, said rolls having cylindrical necked and end portions, comprising in combination, vertically adjustable radial bearing chocks directly connected to said housings to engage said necked portions and support said rolls, a hollow generally cylindrical anti-friction thrust bearing having inner and outer races, said inner race being fixed around the end portion of one of said rolls, a bearing box generally enclosing and rigidly connected to said outer race, said bearing box having generally planar vertical sliding surfaces on opposite sides of the exterior thereof, said surfaces being parallel to and generally on opposite sides of the axis of said one of said rolls, a yoke rigidly connected to the housings adjacent said end portion, said yoke extending generally horizontally around said bearing box outwardly thereof and generally at the level of said axis, said yoke further having generally planar vertical surfaces providing unstressed relative vertical slidable adjustment engagement with said first-named surfaces and relative axial adjustment engagement movement without rotational movement between said bearing box and said yoke, an adjusting screw respectively connecting said bearing box and yoke, said adjusting screw being fixed in said bearing box and extending through said yoke, and adjusting nuts threadably engaging said adjusting screw on opposite sides of said yoke, whereby unstressed axial movement of said one of said rolls may be obtained in either axial direction by the corresponding relative rotation between said adjusting screw and said nuts.

References Cited in the file of this patent

UNITED STATES PATENTS

| Number | Name | Date |
|---|---|---|
| 1,337,882 | Bott | Apr. 20, 1920 |
| 1,839,497 | Peterson | Jan. 5, 1932 |
| 1,936,672 | Iversen et al. | Nov. 28, 1933 |
| 2,155,747 | Wood | Apr. 25, 1939 |
| 2,178,628 | Duda | Nov. 7, 1939 |
| 2,184,463 | Morgan | Dec. 26, 1939 |
| 2,200,837 | Fass | May 14, 1940 |
| 2,335,800 | Sheperdson et al. | Nov. 30, 1943 |